Oct. 12, 1943.                 J. HIRSCHBERGER                 2,331,836
                   APPARATUS FOR RECLAIMING OR REGENERATING
                       RUBBER FROM RUBBER WASTE PRODUCTS
                         Original Filed Nov. 20, 1940
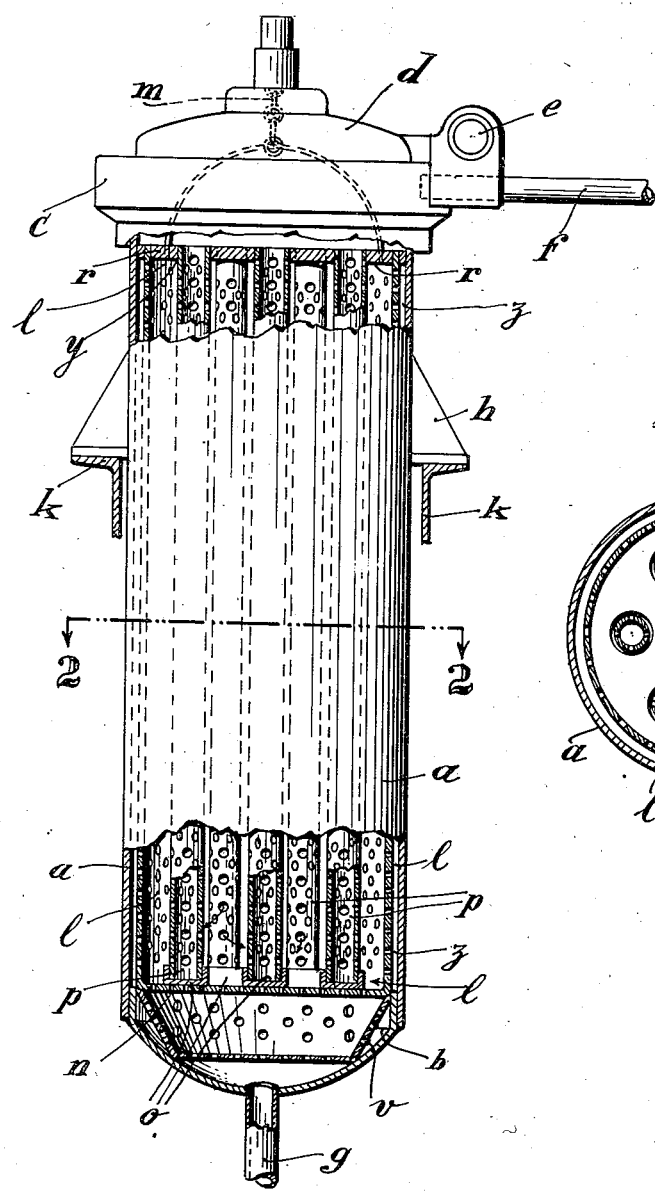
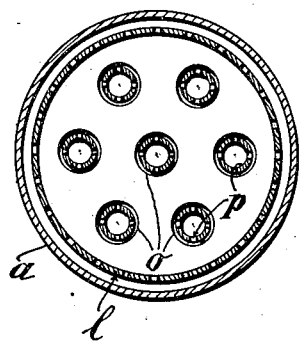
INVENTOR.
Jakob Hirschberger
BY Patented Oct. 12, 1943

2,331,836

UNITED STATES PATENT OFFICE 2,331,836

APPARATUS FOR RECLAIMING OR REGENERATING RUBBER FROM RUBBER WASTE PRODUCTS

Jakob Hirschberger, New York, N. Y.

Original application November 20, 1940, Serial No. 366,408. Divided and this application June 11, 1942, Serial No. 446,633

2 Claims. (Cl. 18—2)

This invention is a division from parent patent application Ser. No. 366,408, filed November 20, 1940.

The invention relates to an apparatus for reclaiming rubber waste.

In order to obtain a satisfactory devulcanisation of rubber waste and scrap it has been hitherto considered essential to disintegrate or to ground the waste and to reduce the same to relatively small particles. These particles are generally charged into an autoclave and treated with high pressure steam.

The outstanding drawback of this procedure is the unequal distribution of the steam within the charge and its uneven action on the waste particles. A further grave disadvantage results from the premature compression of a large portion of the waste rubber piece by the steam into a more or less coherent body before the steam was given sufficient time to act upon the charge; consequently, large portions of the charge remain incompletely treated.

The high-pressure steam method, therefore, proved to be uneconomic and the rubber waste reclaiming methods based on this working principle have up to now not obtained practical importance.

Needless to state that the preliminary mechanical disintegrating of the waste rubber articles greatly increases the costs of the process.

In view of these deficiencies the present invention is based on the recognition that in substitution of the mechanical pretreatment of the waste the introduction of the high-pressure steam into the charge must be controlled in such a manner as to provide access to substantially the entire surface of each rubber waste particle.

In order to improve the distribution of the devulcanizing agent receptacles for the ground rubber waste have been designed which by perforated vertical partitions are divided into a plurality of compartments, each partition having a double wall, so as to provide an intervening air space which is closed at its upper end by perforated metal to prevent the scrap rubber entering the space when filling the container.

However, the disadvantage of uneven and incomplete admission of the steam is not obviated by these receptacles because the steam would enter into the ground charge on the entire surface of the receptacle and from all sides and directions through the closely perforated walls. The charge is, therefore, very quickly compressed into a more or less coherent body and free penetration of the steam into the charge is prevented.

It, therefore, is the main object of the invention to introduce the high-pressure and preferably saturated steam into the reaction receptacle or autoclave in such a manner that the same is not only uniformly distributed throughout the entire charge, but also has an easy and free access to all parts of the same.

It is a further object of the invention to charge the waste rubber into the treating receptacle essentially in their original state.

Another object of this invention is to control the supply to the autoclave of the uniformly distributed steam in accordance with the character of the rubber waste under treatment.

It is also an object of the invention to prevent the premature clogging together by the high-pressure steam of portions of the charge or the formation of an outer crust which prevents the penetration of the steam into the inner portions of the same.

It is another important object to reduce the manufacturing costs to a minimum and to produce a completely devulcanized and thoroughly uniform rubber mass.

The invention makes it also possible to reclaim the rubber from synthetic waste rubber articles which hitherto has not been achieved by any known rubber regenerating method.

With these and other objects in view which will be apparent as this description proceeds, an apparatus for carrying out this invention is illustrated by way of example in the attached drawing of which Fig. 1 is a general view of the apparatus in part-sectional elevation and Fig. 2 is a cross section according to line 2—2 of Fig. 1.

The treating receptacle which is built on the lines of a customary autoclave consists of a cylinder $a$, a base part $b$ and a top part $c$. A cover $d$ is provided to tightly close the inner space of the autoclave. This cover is rotatable about pivot $e$ which latter is supported by top part $o$.

The steam is introduced into the inner space of the autoclave through tube $f$ and is discharged from the bottom section $b$ through tube $g$. Brace members $h$ are fastened to the cylinder $a$ and the autoclave is supported thereby on a carrying structure $k$.

The waste is charged into cylindrical receptacle $l$. The receptacle is suspended from a chain $m$ and may be inserted in the autoclave or lifted therefrom by a crane (not shown). It is provided with a bottom plate $n$; the cylinder wall and the bottom plate $n$ are perforated. Cups $o$ are located on bottom plate $n$ of the charging vessel for removable insertion of perforated tubes $p$. These tubes are uniformly distributed within the charging vessel $l$ as shown in Fig. 2, and unrestricted vertical steam paths of substantially equal length are created within the charge. The vessel $l$ is preferably closed at the top by a plate $r$ which is provided with orifices $y$ in which the tube $p$ project. The tubes are loosely inserted into the cups and can be easily removed from and inserted into the receptacle.

This removable location of the steam conducting tubes is highly important for the performance of the invention, because it has the great advantage that the action and the distribution of the steam may be adjusted in accordance with the nature of the rubber scrap under treatment.

Some types of rubber scrap, such as sponge rubber scrap, pure rubber scrap and rubber scrap which originates from energetically masticated rubber mixtures may be quickly and easily reclaimed.

In these cases a smaller number of steam introducing tubes may be used without impairing an even steam distribution or creating the danger of premature compression of the charge.

It may be, for instance, sufficient to introduce the steam through one center tube only, whereby nearly the total space of the receptacle can be utilized; it is also possible to work with only three of the peripheral tubes or with the center tube plus three peripheral tubes.

If waste rubber goods are reclaimed which require more energetic treatment, a greater number of tubes than exemplified in the drawing may be employed in order to assure the necessary distribution and access of the steam throughout the charge.

In the base part of the autoclave a stool $v$ is provided having perforated walls. This stool carries the charging vessel $l$. An annular space $z$ is provided between the charging vessel and the cylinder $a$.

My rubber reclaiming method is carried out by means of the above described apparatus in the following manner.

The top cover $d$ of the autoclave is opened and the charging receptacle $l$ which has been previously filled with the waste rubber is inserted into the autoclave by means of chain $m$. The vessel $l$ is lowered into the autoclave until it rests on stool $v$. The autoclave is tightly closed and high-pressure saturated steam is introduced into the autoclave by means of pipe $f$. The operating pressure is maintained at approximately 700 pounds per square inch. The treating temperature accordingly ranges at about 490° C.

The working conditions greatly depend upon the character of the rubber waste under treatment; these conditions may be controlled by varying the number of the steam introducing tubes.

The steam enters from above into the perforated tubes and into the annular space $z$. It flows through the tubes and the said space in a downward direction and enters into the charge only in a substantially horizontal direction.

In this manner a thoroughly uniform distribution of the steam is effected throughout the entire charge and each rubber article is acted upon by the steam substantially on its entire surface. This introduction of the steam has at the same time a kind of a loosening action and prevents the premature clogging together of portions of the charge, whereas by the direct introduction of the steam from all sides into the treating receptacle the outer portions of the charge are soon made impenetrable, the result being a partly incomplete devulcanisation of the rubber.

As soon as the treatment is terminated the cover $d$ is opened, the vessel $l$ is lifted from the autoclave and its contents emptied out and cooled at room temperature; the final product has a wholly uniform character and is a completely devulcanized rubber mass.

The invention is not restricted to the treatment of the waste rubber articles with high-pressure steam and other devulcanizing agents, for instance gases or alkaline liquors may be used without departing from the spirit of the invention. In these cases it is advisable to externally heat the reaction receptacle by a steam jacket or other suitable heating means.

I claim:

1. An apparatus for reclaiming rubber scrap by means of high pressure steam comprising an autoclave, an upper steam introducing zone, a lower steam discharging zone, a processing zone located between the said steam introducing and lower steam discharging zone, the said three zones being located in the said autoclave, means for supplying high pressure steam to the said steam introducing zone, means for discharging said steam from the said steam discharging zone, a rubber scrap charging and processing receptacle having perforated walls, said receptacle being adapted to be inserted into the said processing zone and to be removed therefrom, means for freely suspending the said receptacle in the said processing zone, a top plate and a perforated bottom plate for the said processing receptacle, openings in the said top plate, means for connecting the steam introducing zone with the processing zone, means for connecting the latter with the steam discharging zone, said means including substantially vertical perforated tubes, cups on the said bottom plate, the said steam carrying tubes being loosely and removably positioned in said cups and in the said plate openings, whereby the intensity of the steam treatment may be controlled and adapted to the varying character of the rubber scrap under treatment.

2. An apparatus for reclaiming rubber scrap by means of high pressure steam comprising an autoclave, an upper steam introducing zone, a lower steam discharging zone, a processing zone located between the said steam introducing and steam discharging zone, the said three zones being located in the said autoclave, means for supplying high pressure steam to the said steam introducing zone, means for discharging said steam from the said steam discharging zone, a rubber scrap processing receptacle having perforated walls, said receptacle being adapted to be inserted into the said processing zone and to be removed therefrom, a top plate and a perforated bottom plate for the said processing receptacle, openings in the said top plate, means for introducing the steam into the processing receptacle, means for connecting the latter with the steam discharging zone, said means including substantially vertical perforated tubes, the said tubes being loosely positioned in the said processing receptacle, whereby the intensity of the steam treatment may be controlled and adapted to the varying character of the rubber scrap under treatment.

JAKOB HIRSCHBERGER.